United States Patent
Heckendorf

(12) 
(10) Patent No.: US 6,213,220 B1
(45) Date of Patent: Apr. 10, 2001

(54) DISC PLOUGH IMPROVEMENTS

(75) Inventor: David W Heckendorf, Maroochy River (AU)

(73) Assignee: Savannah Forestry Equipment, Inc., Savannah, GA (US)

( * ) Notice: Subject to any disclaimer, the term of this patent is extended or adjusted under 35 U.S.C. 154(b) by 0 days.

(21) Appl. No.: 09/476,199

(22) Filed: Jan. 3, 2000

(30) Foreign Application Priority Data

Jan. 4, 1999 (AU) .................................................... PP7998

(51) Int. Cl.$^7$ ........................................................ A01B 5/06
(52) U.S. Cl. ............................................. 172/579; 172/662
(58) Field of Search .................................... 172/579, 518, 172/540, 583, 662, 694, 744, 748

(56) References Cited

U.S. PATENT DOCUMENTS 3,088,527 * 5/1963 Burch .................................... 172/579

* cited by examiner

Primary Examiner—Christopher J. Novosad
(74) Attorney, Agent, or Firm—Quarles & Brady LLP

(57) ABSTRACT

A disc plow having a stump jump capability. The plow includes a frame and at least one trailing arm secured thereto. The trailing arm supports at least one concave disc thereon. In use, the concave disc attached to the trailing arm has a working position in which the concave side of the disc is inclined so as to be open to any approaching soil and, a release position in which the concave side of the disc is directed at right angles to a forward to rearward alignment of the plow.

12 Claims, 4 Drawing Sheets

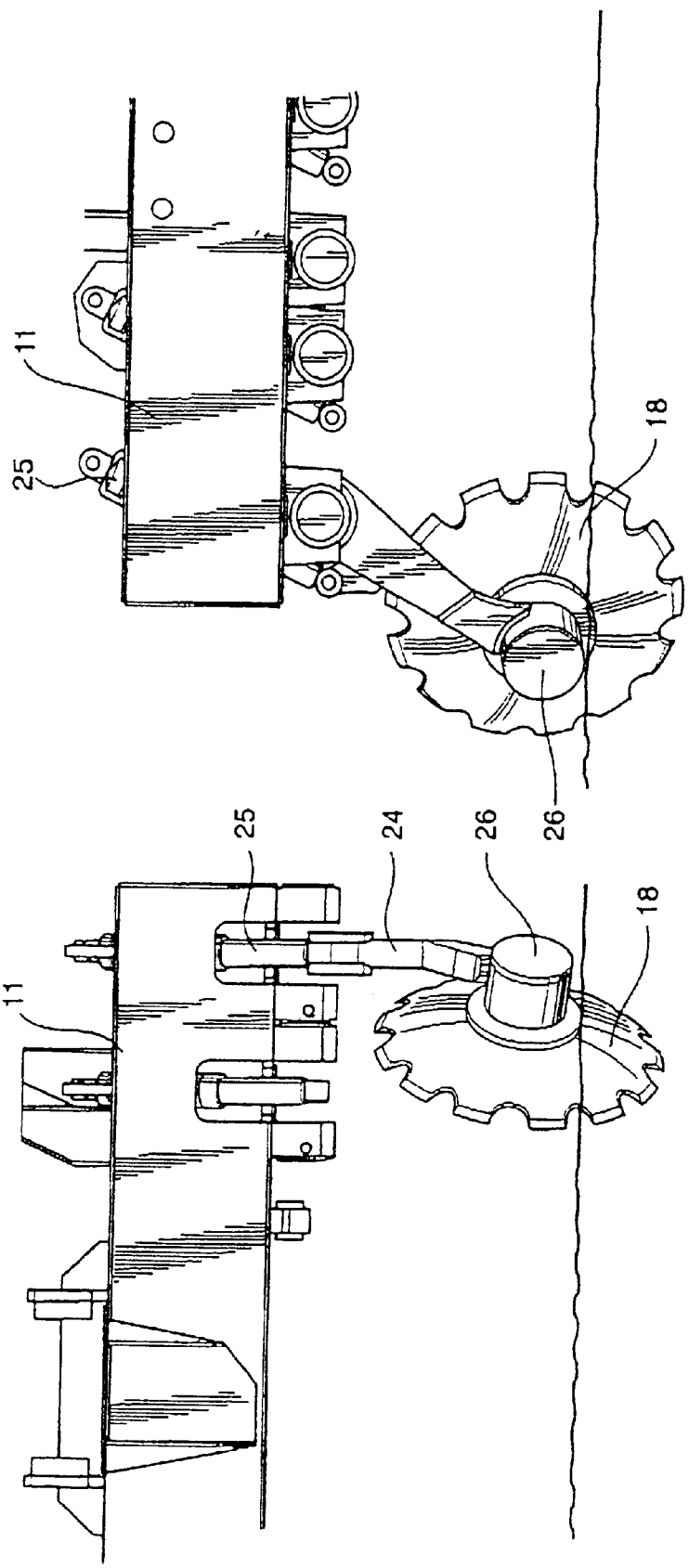

DISC PLOUGH IMPROVEMENTS

Figure 1:
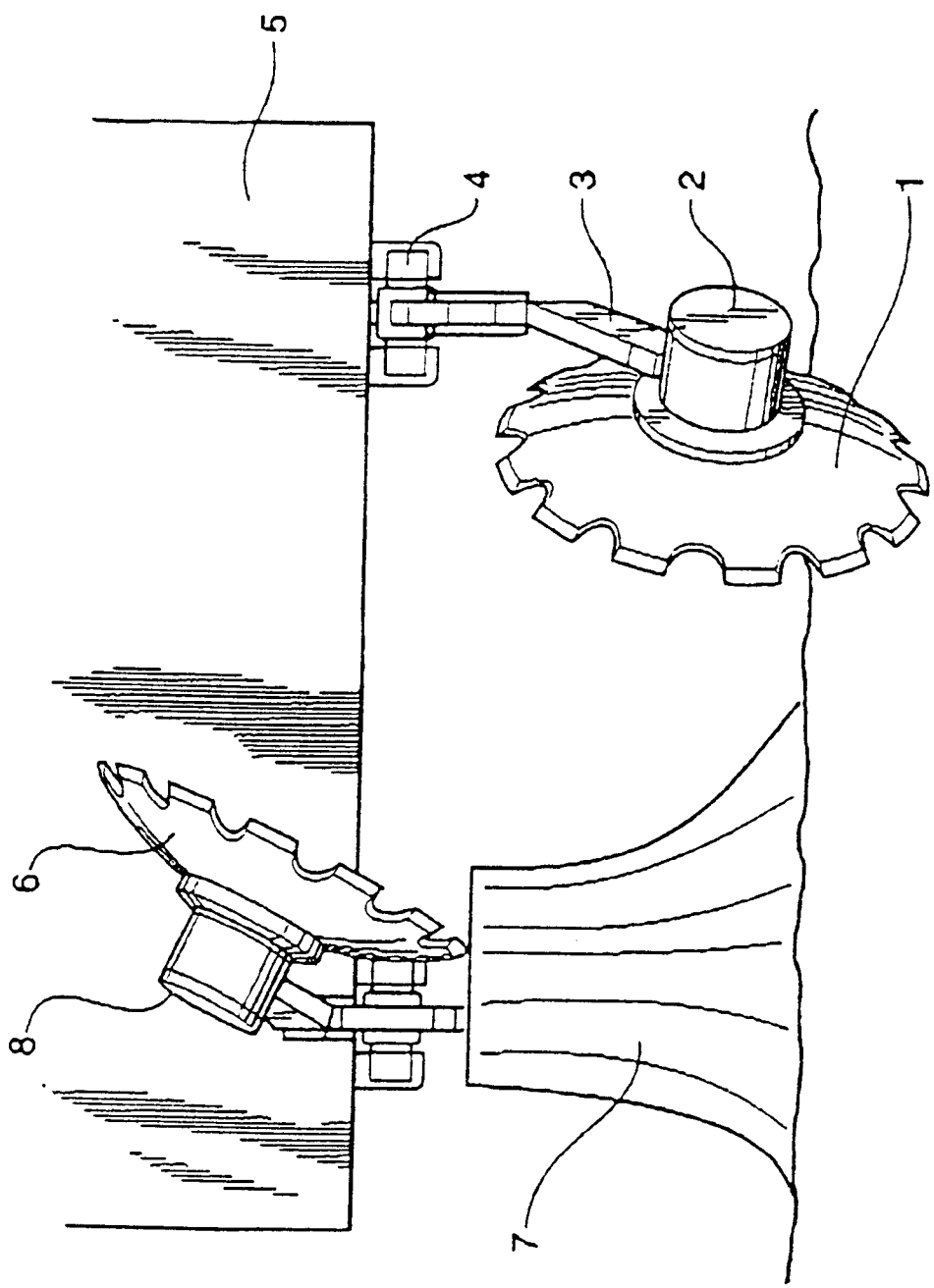

This invention relates to a method and apparatus relating to disc plows of a type where one or more discs are drawn behind a supporting frame for purposes of plowing and which have a jump stump capabltity.

Disc plows of this general type are known.

In applications however such as plowing in forestry debris, the plows are subjected to substantial forces and are used in situations which can only be described in terms of challenge to the equipment, as horrific.

Typical of the difficulties are situations where such equipment will be pulled over existing tree stumps. The difficulty currently experienced in such circumstances is that existing equipment will either wear very quickly indeed under such circumstances or will be subjected to forces that simply cannot be handled and result in bending or fracturing of parts.

In circumstances where overhead costs associated with traction equipment and salaries are being lost during any such loss of use of the equipment this can mean that such difficulty is very serious in this industry.

An object of this invention is therefore to propose disc plows generally of the type being described which are more able to meet the conditions of severe use with either reduced wear or reduced potential breakage from those plows of a design which has been hitherto used.

BRIEF SUMMARY OF THE INVENTION

The invention relates to a disc plow wherein at least one of the discs is a concave disc supported by a trailing arm where the trailing arm is supported at a forward most location to rotate about an axis which is transverse to an expected forward direction of the apparatus.

In a preferred form the invention can be said to reside in a disc plow comprising a frame to which is secured at least one disc supported by a trailing arm where the trailing arm is secured to the frame at a forward most location by a pivot connection, the axis of the pivot connection having its axis of rotation transverse to a forward to rearward alignment of the plow, with the trailing arm extending between the forward pivot support and the more rearward positioned concave disc, a pivot connection connecting between the trailing arm and the concave disc such that the concave disc is rotationally supported to be rotatable about an axis which is at right angles to a plane defined by an outermost circular perimeter of the disc disregarding any scallop in such outer perimeter shape and passing through a center of the circular perimeter, and supported by the rearward end of the trailing arm so that, in a normal working position, there is an angle of inclination of this axis relative to the forward to rearward alignment so that the concave side of the disc is inclined to be open to the approaching working material and such that in a maximum elevation position has an alignment of the axis of the disc where the lowermost peripheral edge of the disc with forward rotation will move in an alignment that is close to or exactly the same as the forward to rearward alignment of the plow.

For conventional plowing, such an arrangement will have the trailing arm extending rearwardly and downwardly from the forward pivot support to where it supports the concave disc with a bearing on the convex side of the disc and such that the disc is able to rotate about its own axis supported by the rearward end of the trailing arm there being an angle of inclination of this axis relative to a forward direction so that the concave side of the disc is inclined to a forward direction so that the concave side is on the front side and is slightly open to the approaching working material.

In accord with this invention, it is proposed that the respective angular relationships between the pivot positions, the trailing arm and the concave disc are such that as the disc engages an obstacle and is caused then to lift in response to such engagement, the axis of the disc will be caused to rotate toward a more transverse orientation with respect to an expected forward direction of the plow.

In preference, this arrangement is such that at a position which is reaching a highest expected position of the disc, the alignment of the axis of the disc will then be either close to or be at a perpendicular orientation to the expected forward direction of the equipment.

With equipment of this type, as the disc is pushed further into an extreme displacement, there will be expected to be increased load on the disc and if the disc is being pulled across the top of a tree stump, then there can be expected to be very significant forces indeed applying both between the stump and the disc, and of course then from the disc to the supporting equipment.

Our discovery is that if the disc can be arranged to have an axial support where the axis is aligned substantially orthogonal to a forward direction, then this significantly reduces or substantially removes side loads which would otherwise have to be allowed for, and the loss of the openness of the concave portion of the disc is of no consequence at such an extreme position where harm minimization is of greatest importance.

This has shown to provide very significant benefit in this application.

In preference, the approach relates to disc plows where there are any number of discs supported behind respective trailing arms.

In preference, there is a support frame which is either directly pulled or supported by a traction vehicle and each of the discs are supported by a trailing arm where the trailing arm has a forward most support comprising a pivotal connection with a support frame where the axis of such a pivot is transverse and in preference at right angles to a forward direction.

Pressure to keep a respective trailing arm and therefore its supported concave disc in a working position can be variously applied but in preference is a pneumatic ram which is separately controlled so that the extent of pressure is separately governable.

In preference, there is at least one concave disc which is supported so that its lowermost edge can reach at least a height (when at a released position) that is at least approximately a lowermost height of parts of the frame in the immediate forward working location of the disc.

This will generally have the result that any obstacle that the supporting equipment forward of the disc will pass over, will be able to divert the disc to that height at least.

This means that obstacles that are simply too big to be handled by the equipment will first impact against the much stronger forward frame members or other parts of the equipment which can be designed to handle this or at least be handled in a different way.

By providing that the trailing disc can reach an apex with its lowermost edge at least substantially the height of the lowermost immediately forward frame members of the equipment, and having the orientation at this point of the disc such that it will be rolling aligned to the forward direction of the equipment, results in significant reduction in loading on the disc and the associated supporting bearings and other parts.

DESCRIPTION OF THE EMBODIMENT

Figure 2:
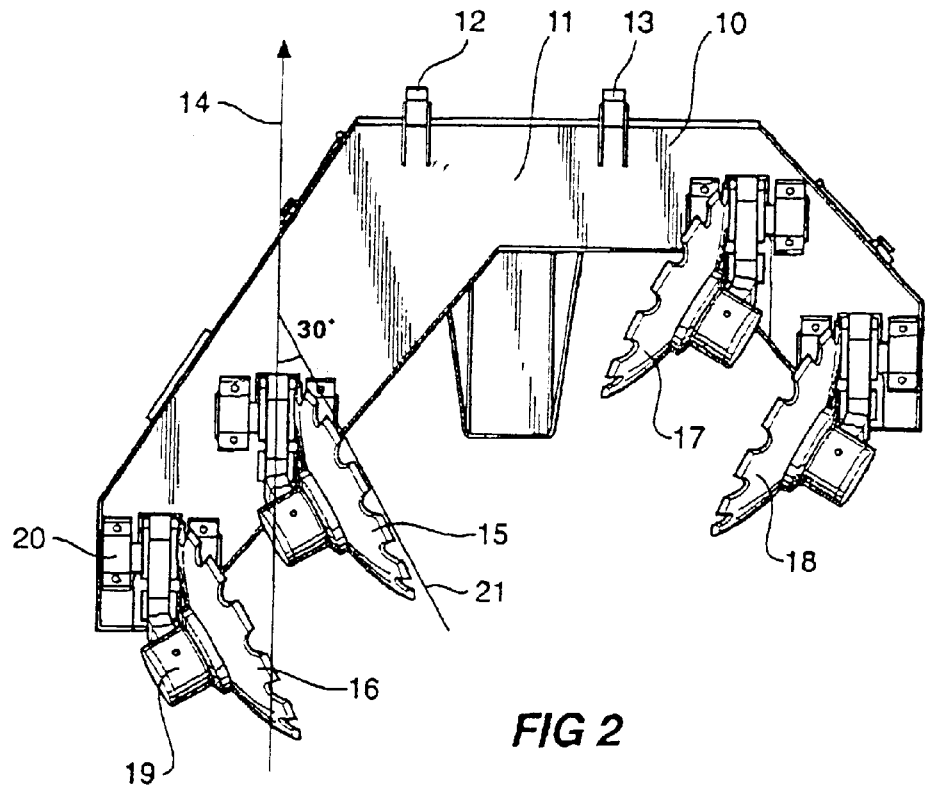
Figure 3:
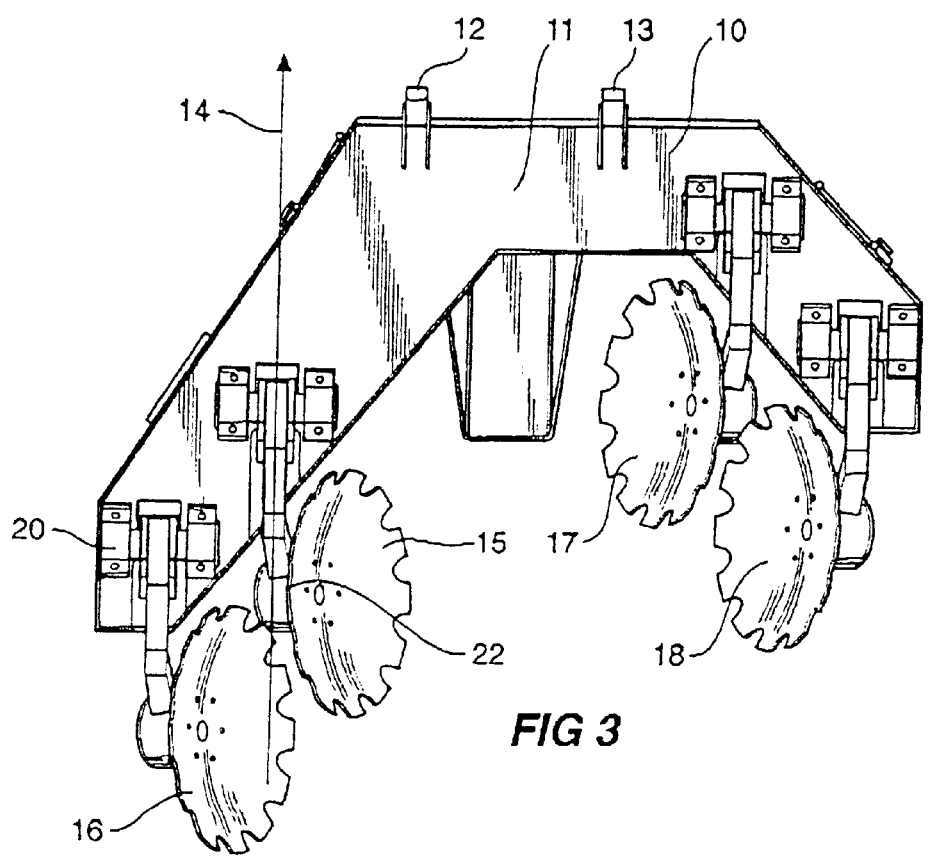
Figure 7:
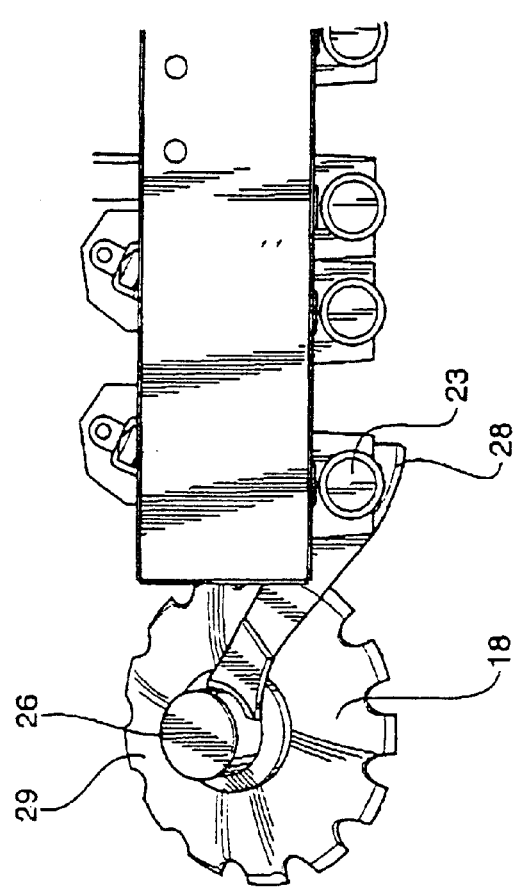
Figure 6:
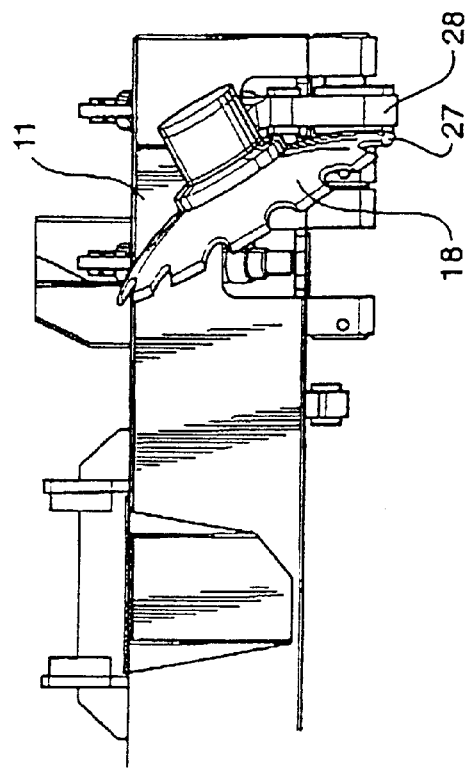

For a better understanding of this invention it will novv be described with reference to a preferred embodiment which shall be described with the assistance of the drawings wherein:

FIG. 1 is a schematic drawing showing from the rear in accordance with a first embodiment, two supported concave discs in accordance with the invention where on the one side, the disc is in a lowermost plowing position, and on the left, the disc is in a most elevated position clearing a slump, FIG. 2 is the view of a further embodiment showing a view from beneath the disc plow with the discs each in a normal plowing position, FIG. 3 is the same view as in FIG. 2 of the same piece of equipment with however each of the discs now raised to the highest position where the lowest most edge will be generally aligned with a lowermost part of the equipment generally directly in front of the disc, FIG. 4 is a view from behind of the same embodiment as in FIGS. 2 and 3 showing however only one of the discs with its related trailing arm when in a normal plowing position, FIG. 5 is a view from the side Of the same arrangement as shown in FIG. 4, FIG. 6 is the same view as in FIG. 4, viewing from behind with however the disc raised on the highest position and, FIG. 7 is the same view as in FIG. 5 with the position of the disc as in FIG. 6.

Referring now in detail to the drawings and in particular to FIG. 1, this shows on the right hand side a concave disc 1 supported so as to have a front concave face partially open to a forward most direction and this is supported s by reason of a pivotal support where the housing is shown at 2 which in turn is supported by a trailing arm 3 which is supported by a forward most pivotal connection at 4 to a frame 5.

In this position, which is the normal plowing position, the axis defined by the pivotal support directly for the disc 1 which is to say the central axis of the disc, will be at approximately 60 degrees to a forward direction which means that a line diametrically across between the disc and horizontal will be at 30 degrees to an expected forward direction.

The way in which this is achieved is by providing that the length of the trailing arm which is to say the distance from the forward most pivotal axis 4 to the support axis related to the housing 2 of the concave disc 1 is chosen so that as the trailing arm 3 rotates through its radius about the axis of the pivotal connection 4, at the position reached in the second of the positions which is the maximal elevation position, then the axis of the discs its about its axis 8 assumes an approximately orthogonal alignment if viewed in plan relative to a forward direction.

This then describes the principle but the actual application in practice is shown in more detail in the remaining Figures showing that the disc plow 10 uses two of the concave discs to each side of a middle forward to rearward alignment supported by a common support frame 11 which has support links at 12 and 13 which are attached in a conventional way to a traction vehicle.

The traction vehicle thereby determines the height and orientation of the plow 11 but there is a forward direction for which the whole arrangement is designed which is shown in this case by arrow 14 and while there can be some deviation from this by reason of some steering direction changes of the traction vehicle, these are incidental to the designed straight forward direction.

FIGS. 2 and 3 show the view from beneath with four disc plows, there being two at 15 and 16 to one side and 17 and 18 to the other. Hereafter, the support apparatus and the disc will be shown in relation to one disc only. It is understood that there can be anything from one disc through to any number or plurality of discs although for the sake of balancing of the pressures on the traction vehicle, it is better to have an equal number of discs plowing on one side as compared to the same number of discs on the other.

Referring now more specifically to the structure as shown in FIGS. 2 and 3, each of the discs 15 through 18 is supported by an appropriate pivotal connection shown typically at 19 which in turn is supported by an arm shown typically at 20 which is supported at a forward most location by an axial support which is orientated so as to be perpendicular to the forward direction 14.

Each of the discs in their lowermost position are positioned so that a line passing through a horizontal diameter will be approximately at 30 degrees to the forward direction 14 and this is shown at 21.

When the discs 15 through 18 are lifted to their maximal extent, which is such that the lowermost portion of each disc shown typically at 22, is at a similar height to a lowermost portion of any other part of the most directly related forward part of the frame shown typically at 23, then the axis about which the respective concave disc rotates is then orthogonal orientated toward the forward direction 14 so that in fact the lowermost edge at 22 will then as it rotationally steps over any obstacle maintain an alignment consistent with the forward direction which will either result in minimal sideways thrust or no sideways thrust on the disc and therefore the associated support structures.

This is achieved by choosing the length of the support arm and the extent of freedom of the support arm as well as matching this with respect to the diameter of the concave disc and its position relative to the support arm.

Such specific criteria can be judged from the drawings which are generally to scale but which can also be judged by reason of very simple experimentation or design adjudication.

More specific details can now be deduced by reason of reference to FIGS. 4, 5, 6 and 7 which show firstly from different views the position of the concave disc 18 noticing that the remainder of the support arms and discs have been removed simply for the sake of clarity.

In these further Figures then, and referring specifically to FIGS. 4 and 5, the disc 18 is supported by the trailing arm 24 which in turn is held in a lowermost position by reason of an air ram 25.

The orientation of the axis defined by the housing 26 is such that the diametrical direction horizontal aspect of the concave disc 18 is at approximately 30 degrees to a forward direction and such that the disc will rotate freely about this axial support.

The position of the disc 18 however is also governed by upward pressures which are provided by such obstacles and debris that it will encounter and in the extreme these will be such that they will force the disc to a position in which a lowermost point 27 is at a height of approximately the lowermost point of any part of the frame of the plow 11 in the immediate forward position which is shown as at 28.

Typically the concave disc is positioned so as to be modestly open (in the sense that when viewed from a position immediately in front of the disk, some of the area within the concave shape of the disk will be visible) to a forward direction as far as the forward aspect of the concave shape is concerned and when it is at a maximum height as shown in FIGS. 6 and 7 is then substantially closed to a forward direction where there will be minimal sideways movement by reason of the rolling stepping action of the scallop shape shown at 29 of the concave disc 18 or especially its periphery.

While reference has been made to a disc plow in which there are four discs each supported independently by an individual trailing arm and having two positioned to capture and effect a plowing to direct dirt into a central alignment, there can be a number of such discs in relation to any number of trailing arms in a broadest concept of this invention.

It is of advantage to have a balance on one side as compared to the other but it is not in a broadest sense, essential.

It is of interest that the current jump height of existing designs has not been sufficient and a number of broken spindles have resulted.

The solution proposed by this invention is to provide a greater lift height for the disc and to change the angle of the disc where it touches any obstacle at its highest displacement position.

The change of angle of the disc is then related to the arc through which the jump arm or trailing arm travels and if the trailing arm is at a 30 degree (this can typically be 25–31 degrees) angle of set (cut) and 6 degrees undercut at the working angle, then when the jump arm or trailing arm is rotated through to a maximum displacement position, it is further arranged that the undercut can change through to an over cut and the angle of set reduces. When the angle of contact or the residual angle of cut is reduced to zero at a maximum displacement then the disc will roll over the stump as a typical obstacle with minimum side load and therefore reduced pressure on any of the parts.

What is claimed is:

1. A disc plow capable of avoiding objects, comprising:
    a frame;
    at least one trailing arm secured to said frame;
    at least one disc having a concave side supported by said at least one trailing arm;
    a first pivot connection securing said at least one trailing arm to said frame, said first pivot connection having a plow axis extending transversely from a forward position of said plow to a rearward position of said plow; and
    a second pivot connection securing said at least one trailing arm to said at least one disc such that said disc is rotatable about a disc axis which is at right angles to a plane defined by an outermost circular perimeter of said at least one disc and passes through a center of said circular perimeter, whereby in a normal working position there is an angle of inclination of said disc axis relative to the said plow axis so that said concave side of said disc is inclined so as to be positioned to receive materials and in a maximum release position, said concave side of said disc is directed at right angles to said plow axis.

2. The disc plow as in claim 1, wherein said at least one disc has an axial support with an axis aligned substantially orthogonally to a forward direction when said disc is configured in a maximum elevation position.

3. The disc plow as in claim 1, further comprising a plurality of discs, wherein each of said discs is supported by a distinct trailing arm.

4. The disc plow as in claim 1, wherein an axis of a lower peripheral edge of at least one of said at least one discs is configured so that, when said disc is rotated in a forward direction, said disc moves substantially into alignment with said frame axis.

5. The disc plow as in claim 1 further comprising a hydraulic ram extending between said frame and at least one of said at least one trailing arms, wherein said ram provides pressure to maintain said at least one trailing arm and the disc supported by said at least one trailing arm in a normal working position.

6. The disc plow as in claim 1, wherein said at least one concave disc has a lowermost edge, and said lowermost edge can reach a height that is at least approximately the same as a lowermost portion of a portion of said frame immediately forward of a working location of said disc when said lowermost edge is in a raised or released position.

7. The disc plow as in claim 1, wherein at least one of said discs is located on each side of said plow, and said at least one disc on each side of said plow is supported by a common support frame having support links which are attached to a traction vehicle.

8. The disc plow as in claim 1 wherein said plow has at least four four discs each supported independently by a respective trailing arm, and wherein at least two of said four discs is positioned on each side of said plow and configured to cause plowing of material in a direction proximate to said plow axis.

9. The disc plow as in claim 1, wherein the change of angle of said disc is related to an arc through which said trailing arm travels, so that when said trailing arm is at a 30 degree angle of set cut and a working angle which is 6 degrees undercut L and said trailing arm is rotated to a maximum displacement position, the undercut will change to an overcut and the angle of set cut will be reduced.

10. The disc plow as in claim 1, wherein said disc is positioned so as to be modestly open to a forward direction as far as the forward aspect of the concave shape is concerned and when it is at a maximum height is then substantially closed to a forward direction where there will be minimal sideways movement by reason of a rolling stepping action of a scallop shape of said disc.

11. A plow, comprising:
    a housing having a front portion a rear portion, and a plow axis extending from said front portion to said rear portion;
    at least one trailing arm having a length;
    at least one disc having a front concave face partially open to said front portion when said plow is in a normal working position;
    wherein said at least one disc is pivotally connected to said trailing arm by a first pivotal support, and said at least one trailing arm is connected to said housing by a second pivotal support; and
    wherein an axis defined by a central portion of said at least one disc is positioned at an angle of approximately 60 degrees relative to said front portion of said plow and said length of said at least one trailing arm is such that as said at least one trailing arm rotates about an axis defined by said central portion of said disc, and said axis of said disc is approximately orthogonal relative to an axis extending from a front portion of said plow to a rear portion of said plow when said at least one trailing arm is in a maximal elevation position.

12. A disc plow, comprising trailing arms discs supported by a frame such that when said discs are lifted to a maximal extent, which is such that a lowermost portion of each said disc is at a height similar to the height of a lowermost portion of any other part of a most directly related forward portion of said frame, an axis about which the discs rotate is approximately perpendicular to said forward portion.

\* \* \* \* \*

UNITED STATES PATENT AND TRADEMARK OFFICE
CERTIFICATE OF CORRECTION

PATENT NO.   : 6,213,220 B1                                   Page 1 of 1
DATED        : April 10, 2001
INVENTOR(S)  : David W. Heckendorf It is certified that error appears in the above-identified patent and that said Letters Patent is hereby corrected as shown below:

<u>Column 3,</u>
Line 5, after "clearing a" [slump] should be -- stump --.
Line 26, after "supported" [s] should be deleted.

<u>Column 6,</u>
Line 13, after "least" the first [four] should be deleted.
Line 22, after "undercut" [L] should be deleted.

Signed and Sealed this

Eighth Day of January, 2002

Attest:

JAMES E. ROGAN
Attesting Officer     Director of the United States Patent and Trademark Office